United States Patent
Moore

[15] 3,670,020
[45] June 13, 1972

[54] CATALYTIC CONVERSION OF NITRILES TO AMIDES

[72] Inventor: Leslie D. Moore, La Grange, Ill.

[73] Assignee: Nalco Chemical Company, Chicago, Ill.

[22] Filed: July 10, 1969

[21] Appl. No.: 840,818

Related U.S. Application Data

[63] Continuation-in-part of Ser. No. 551,197, May 19, 1966, abandoned.

[52] U.S. Cl. ...................260/561 N, 260/209 R, 260/404, 260/561 R
[51] Int. Cl. ..........................................C07c 103/00
[58] Field of Search ..........................260/561 N, 561 R

[56] References Cited

UNITED STATES PATENTS 2,885,435   5/1959   Pursglove .............................260/518

OTHER PUBLICATIONS

C.A., 1943 yr., 25$^5$ page, Vol. 37.

*Primary Examiner*—Lewis Gotts
*Assistant Examiner*—Ethel G. Love
*Attorney*—John G. Premo and Charles W. Connors

[57] ABSTRACT

A method of producing amides by reacting nitriles with water in the presence of certain basic catalysts. It is specifically directed to producing acrylamide from acrylonitrile.

8 Claims, No Drawings

CATALYTIC CONVERSION OF NITRILES TO AMIDES

This application is a Continuation-in-Part of my copending application Ser. No. 551,197 filed May 19, 1966, now abandoned.

This invention relates to a method of producing amides by reacting nitriles with water in the presence of a base catalyst. The invention is particularly concerned with the reaction of acrylonitrile with water to produce hydracrylamide.

When nitriles are contacted with alkaline materials, carboxylic acid salts usually result. In fact, it is difficult to control the basic hydrolysis of nitriles to produce amides without producing carboxylic acids as the principal product. In the case of acrylonitrile, when it is reacted with aqueous caustic solutions, it is common to find that the resultant product produced by such hydrolysis is principally the sodium salt of hydracrylic acid.

Certain nitriles, such as acrylonitrile, are capable of reacting with mineral acids such as sulfuric or hydrochloric acid to produce amide salts which are then capable of being neutralized to produce amides such as acrylamide. While this reaction is satisfactory for producing acrylamide from acrylonitriles, it has several disadvantages. In one instance when sulfuric acid is used as the reacting medium, it is necessary to use glass-lined equipment since the reaction is conducted in a corrosive medium. In other instances, the reaction tends to "run away" as evidenced by elevated temperatures and the production of undesirable by-products. In certain processes for producing amides such as acrylamide from unsaturated nitriles such as acrylonitrile, polymerization occurs thereby reducing yield and producing as by-products undesirable resinous substances.

There have been some suggestions that ion exchange resins may be used to convert nitriles to amides, but these reactions are not entirely satisfactory since even though they produce amides, the ion exchange resins are cumbersome materials to use, and in the case of cation exchange resins, long reaction times are required. Another disadvantage of using either basic or acidic ion exchange resins to produce amides from nitriles is that the ion exchange resins are relatively expensive and tend to degrade, with such degradation resulting in the loss of their basic or acidic properties.

A number of attempts to hydrolyze nitriles to produce amides have been made with little success in this area of chemical reactions. The rate of hydrolysis of the amides to acids is usually substantially faster than the rate of the formation from the nitrile. This substantially greater rate makes it almost impossible to isolate the amides as intermediates. As one example, the rate of hydrolysis of formamide to acid is 14,000 times faster than the rate of its formation from hydrogen cyanide.

The one class of compounds which are an exception are the t-alkyl cyanides in which hydrolysis stops at the amide stage. Similarly, some cyclic compounds such as 3-cyanopyridine have been reacted to form amides, but in each of these cases, it is essential that the cyclic nature of the compound function as in the t-alkyl reaction described above. In each case, it is believed that stearic hindrance prevents further hydrolysis to the acid form.

A few other methods to prepare amides from nitriles have been developed which employ basic catalyst along with trace amounts of water. For example, U.S. Pat. No. 2,885,435 discloses that certain specific amide compounds may be prepared using a strong basic catalyst and mere traces of moisture. The reference further states that increasing amounts of water up to an equal molar portion results in great proportions of the further hydrolysis to the acid form. Thus, when large amounts of water are employed, substantially complete hydrolysis causes the end product to be almost solely acid, with essentially no amide being present.

The above summary indicates that it would be a benefit if it were possible to provide a new process for converting nitriles to amides which would be simple, economic and allow amides to be produced in good yields without production of the corresponding acid, and could be operated as a continuous process. It is therefore an object of this invention to provide an improved method for producing amides from nitriles.

Another object of this invention is to provide a method for converting acrylonitrile to hydracrylamide using simple effective, yet economical techniques.

A further object of this invention is to provide a continuous process for producing hydracrylamide from acrylonitrile, wherein the hydracrylamide can later be dehydrated to acrylamide.

Other objects will appear hereinafter.

In accordance with the invention, it has been discovered that nitriles can readily be converted to amides by reacting the nitrile with water in the presence of a catalytic amount of certain base materials. Specifically, the invention is concerned with reaction of acrylonitrile with water in the presence of certain basic materials to produce hydracrylamide. The invention is particularly directed to a method of producing hydracrylamide from acrylonitrile which allows the amide to be produced in such a fashion whereas substantially minor amounts of organic acid are produced.

The invention lends itself to the treatment of a wide variety of nitriles. For purposes of illustration, the following nitriles are suited for processing in accordance with the invention.

| | |
|---|---|
| Butyronitrile | Palmitonitrile |
| Valeronitrile | Margaronitrile |
| Capronitrile | Stearonitrile |
| Enanthonitrile | Malononitrile |
| Caprylonitrile | Glutaronitrile |
| Pelargonitrile | Alpha-cyanopropionic acid |
| Caprinitrile | 3-butenenitrile |
| Hendencanenitrile | 4-pentenenitrile |
| Lauronitrile | 2-hexenenitrile |
| Hydracrylonitrile | cis- |
| Epicyanohydrin | trans- |
| Lactonitrile | 2-heptanenitrile |
| Pyruvonitrile | cis- |
| Mandelonitrile (DL) | trans- |
| Tridecanenitrile | glycolonitrile |
| Myristonitrile | Amygdalin |
| Pentadecanenitrile | |

While the invention has applicability to converting the above nitriles into their corresponding amides, the invention is particularly useful in the treating of aliphatic nitriles which contain not more than five carbon atoms in chain length. The invention is particularly suitable to the production of amides from acrylonitrile to provide hydracrylamide as the finished product.

An important concept of the invention resides in the use of catalytic amounts of the basic material which allows the nitriles to be converted into their corresponding amides by treatment with water. The catalytic materials to be operative in the practices of this invention should be either water-soluble, liquifiable under the conditions of the process or be in the form of a gas under the conditions of the process. In addition to having at least one of the above characteristics, it is important when unsaturated nitriles are being used as starting compounds, that the basic catalytic materials be free from any hydrogen atoms attached directly to an element contained in Group Va of the Periodic Table.

A basic substance meeting the above conditions may be selected from any of the well-known alkali metal or alkaline earth metal hydroxides, e.g. sodium, potassium, calcium, magnesium and barium hydroxides. The alkaline earth metal hydroxides at the temperatures and pressures used in the invention are sufficiently water-soluble to be catalytically effective. These materials correspond to Groups Ia and IIa of the Periodic Table. In the field or organic bases, any compound containing a basic atom of Group Va of the Periodic Table may be used. Due to availability, the amines, amine salts and quaternary ammonium salts and bases are preferred.

Basic organic materials which may be used to advantage to prepare amides from unsaturated nitriles in the invention are tertiary and quaternary onium hydroxides and salts. Illustrative of such materials are the well-known tertiary amines, phosphines, arsines and stibines and their corresponding onium salts and bases. Of these compounds tertiary amines, particularly lower aliphatic amines containing not more than 15 carbon atoms are preferred.

Exemplary of the onium salts, hydroxides and tertiary amines, phosphines, arsines, and stibines are the following compounds:

trimethyl amine
tetramethylammonium hydroxide
tetramethylammonium chloride
tributyl amine
dibutyldimethylammonium hydroxide
triethyl phosphine
tetramethylphosphonium hydroxide
lauryltrimethylammonium chloride
triphenyl amine
methylpyridinium chloride It is to be understood that the above listing of suitable basic materials is exemplary and that many other well-known basic materials meet the above set forth requirements and are suitable for use in the invention.

The conditions under which the conversion of nitriles to amides is carried out in accordance with the invention, are important since it is necessary that certain temperature, pressure and other conditions be met so as to provide optimum yields of amides and to minimize the production of unwanted by-products, such as the acids derived from the amides.

The invention is conducted at temperatures of at least 230° F. with a preferred temperature range being between 250° and 360° F. While there is no particular upper temperature limit no advantage is obtained by operating above 450° F.

It is desirable that the pressures utilized be in excess of 50 lbs. per square inch above the steam stable pressures of the particular temperature at which the reaction is carried out. The steam table pressures are well-known and described in such well-known works as "Handbook of Chemistry and Physics," 36th Edition (1954) pages 2144–2146. In most cases, the pressures will be within the range between 100 and 800 lbs. per square inch with a preferred pressure range being between 200 and 700 lbs. per square inch.

The time necessary to convert the nitriles to the amide is conveniently expressed in terms of the liquid hourly space velocity (LHSV), which for purposes of this invention may be defined as the volumes of charge of nitrile per volume of heated zone per hour.

The particular liquid hourly space velocity required for adequate conversion of the nitriles to the amides may vary between 0.5 and 70 with a preferred liquid hourly space velocity being within the range of 8 to 50.

The relationship of basic catalyst and water to nitrile should be regulated to give optimum operating conditions. In the case of the water used in the reaction, as little as one mole to as much as 50 moles of water per mole of nitrile may be used, although excellent results are achieved when the molar ratio is in the range of 2 to 24 moles of water per mole of nitrile.

The relationship of the basic material to the nitrile may be varied somewhat from as little as 0.005 to as much as 0.5 moles of basic material per mole of nitrile, being used to obtain good results. A preferred molar ratio range of basic catalytic material to nitrile is from 0.01 to 0.2:1. A most preferred range is 0.02 to 0.1:1.

Due to the utilization of elevated temperatures and pressures it is desirable that the invention be conducted in a vertical reaction vessel of the type used in the production of petrochemicals. By using such a type petrochemical reactor, it is possible to control the liquid hourly space velocity and to control the addition of the feed stocks which comprise the nitrile, water and basic catalyst. Such reactors also conveniently lend themselves to the withdrawal of finished products.

The following examples are presented to illustrate many of the advantages obtained by using the practices of this invention.

EXAMPLE I

A small 6 foot coil reactor was fitted with appropriate electrical and pressure monitoring devices and also equipped with self feed and withdrawal lines. The void space of the reactor was 15 ml and it was capable of being heated by means of an oil bath to temperatures in excess of 230° F. A gas pressurizing system was used to pressure the reaction vessel to the desired pressure. Aqueous solutions of base and nitrile were charged to the reactor through separate lines. Utilizing these conditions a series of experiments were conducted to determine the adequacy of the invention. The results of these experiments are presented below in Table I.

TABLE I

| Experiment | Temp., °F. | Press. p.s.i.g. | LHSV | Molar ratios | | Conversion, percent | Product distribution, mole percent | | | |
|---|---|---|---|---|---|---|---|---|---|---|
| | | | | H$_2$O/C=CCH | NaOH/C=CCN | | HOCCCOOH | HOCCCN | HOCCCOHH$_2$ | O(CCCN) |
| I | 80 | 0 | 1 | 6 | 0.03 | 75 | 3 | 6 | 1 | 90 |
| II | 200 | 0 | 1 | 6 | 0.03 | 85 | 3 | 48 | 2 | 47 |
| III | 300 | 310 | 10 | 6 | 0.02 | 90 | 2 | 25 | 63 | 10 |
| IV | 300 | 600 | 11 | 11 | 0.07 | 95 | 7 | 16 | 74 | 3 |
| V | 300 | 600 | 11 | 24 | 0.16 | 98 | 16 | 2 | 82 | 0 |
| VI | 350 | 600 | 18 | 14 | 0 09 | 99 | 9 | 8 | 74 | 9 |
| VII | 350 | 600 | 48 | 6 | 0.03 | 99 | 3 | 16 | 65 | 16 |
| VIII ᵃ | 350 | 600 | 18 | 14 | 0.09 | 89 | 9 | ᵇ 4 | 85 | 2 |
| IX | 320 | 600 | 2 | 6 | ᶜ 0.05 | 66 | 0 | 54 | 37 | 9 |

ᵃ Experiment identical to VI but charged hydracrylonitrile.
ᵇ Acrylonitrile
ᶜ Catalyst used was triethylamine at a molar ratio (Et$_3$N/C=CCN) of 0.05.

In Table I the conversion rates indicate the amount of nitrile converted to different products. The product distribution column shows the products produced. A careful inspection of Table I shows that, for good yields of hydracrylamide from acrylonitrile, it is necessary that the temperatures be in excess of 200° F., and that the pressures be in excess of about 200 lbs. per square inch. It should be noted that when optimum conditions are reached the hydracrylamide yield is high and that the by-products which are namely hydracrylic acid, hydracrylonitrile, and bis (2-cyanoethyl) ether, are minimized. The most interesting and unique data in Table I is that the very low yields of acid produced are stoichiometrically equivalent to the amount of NaOH charged. Of importance is that no polymerization products resulted from the process.

An important concept of the invention is that the by-products shown in Table I, with the exception of hydracrylic acid, are capable of being recycled back into the reaction zone whereby they may be further acted upon by the process to produce more amide. This factor means that the invention is admirably suited to a continuous process thereby enabling large scale production of amides to be achieved.

In a preferred embodiment, the process of this invention may be carried out by including in the initial reaction mixture at least 1 to 4 and preferably 2 moles, based on the unsaturated nitrile charged, of a lower water-miscible alcohol of not more than 6 carbon atoms; e.g., methanol. The products resulting from the use of the alcohol are the ether analogues of the hydranitriles and corresponding amides. These ethers, either thermally or by treatment with suitable bases, e.g., aqueous solutions of alkali metal hydroxides, are quantitatively dealkoxylated to the unsaturated nitriles and amides. The nitriles may be recycled back to the reactor and the acrylamide may be recovered. An example of this technique is presented below in Example II.

EXAMPLE II

In a manner similar to Example I, methanol (2.0 moles), water (2.5 moles), NaOH (0.07 moles), and acrylonitrile (1.0 mole) were charged at 300° F., 300 psig, and 24.0 LHSV of acrylonitrile. A 100% conversion of acrylonitrile to the following products was obtained: methoxyproprionitrile 18 percent, methacrylamide 75 percent, and methoxyproprionic acid 7 percent. Treatment of the first two products with aqueous base at 350° C. and atmospheric pressure converted them to acrylonitrile (for recycle) and acrylamide.

For purposes of showing the versatility of the invention, Example III below illustrates the preparation of a saturated amide from a saturated nitrile.

EXAMPLE III

In a manner similar to Example I, acetonitrile (1.0 mole), water (4.3 moles) and NaOH (0.03 moles) were charged at 350° F., 600 psig, and a 12.8 LHSV of acetonitrile. A 54 percent conversion of acetonitrile to the following products was obtained: acetamide, 94.5 percent and acetic acid, 5.5 percent.

The by-products produced with the amides may be separated from the desirable amide products by using such means as distillation, solvent extraction, absorption, fractional crystallization and the like. As indicated, and this being particularly important in the case of hydracrylamide, it is possible to utilize acrylonitrile, water, and a minor amount of a basic catalytic material to afford a continuous inexpensive process for producing hydracrylamide of good quality and high yield, with such product being readily converted to acrylamide which is free from unwanted polymer and other products which would tend to make the finished acrylamide unsuitable as a monomer for the production of a variety of homo- and copolymers of acrylamide.

Having thus described my invention, what is claimed is:

1. In a process of the type for producing unsubstituted amides from saturated nitriles which under conditions of caustic hydrolysis are normally converted to carboxylic acids the improvement which comprises reacting from 1 to 50 moles of water with 1 mole of an organic unsubstituted saturated aliphatic nitrile which contains not more than 5 carbon atoms under the following conditions:
    A. At a temperature between 230° F. to 450° F.,
    B. At a pressure between 50 psi to 800 psi,
    C. At a liquid hourly space velocity between 0.5 and 70,
    D. In the presence of a catalytic amount of a compound from the group consisting of a metal hydroxide from Group Ia and IIa of the Periodic Table and tertiary amines, quaternary ammonium salts, and quaternary ammonium hydroxides having at least one of the following characteristics:
        1. Water soluble,
        2. Liquefiable under conditions of the process,
        3. Gaseous under conditions of the process, and then recovering the amides produced by said process with the proviso that the molar ratio of catalytic basic material to the organic nitrile does not exceed 0.5:1.

2. The process of claim 1 where the molar ratio of water to organic nitrile is at least 2:1.

3. In a process of the type for producing unsubstituted amides from unsubstituted unsaturated nitriles which under conditions of caustic hydrolysis are normally converted to carboxylic acids, the improvement which comprises reacting from 1 to 50 moles of water with 1 mole of an organic unsubstituted unsaturated aliphatic nitrile which contains not more than five carbon atoms under the following conditions:
    A. At a temperature between 230° F. to 450° F.,
    B. At a pressure between 50 psi to 800 psi,
    C. At a liquid hourly space velocity between 0.5 and 70,
    D. In the presence of a catalytic amount of a compound from the group consisting of a metal hydroxide from Group Ia and IIa of the Periodic Table and tertiary amines, quaternary ammonium salts, and quaternary ammonium hydroxides having at least one of the following characteristics:
        1. Water soluble,
        2. Liquefiable under conditions of the process,
        3. Gaseous under conditions of the process, and then recovering by dehydration of a hydrated intermediate when necessary, the amides produced by said process with the proviso that the molar ratio of catalytic basic material to the organic nitrile does not exceed 0.5:1.

4. In a process for producing acrylamide from acrylonitrile under conditions of caustic hydrolysis the improvement which comprises reacting from 1 to 50 moles of water with 1 mole of acrylonitrile under the following conditions:
    A. At a temperature between 230° F. to 450° F.,
    B. At a pressure between 50 psi to 800 psi,
    C. At a liquid hourly space velocity between 0.5 and 70,
    D. In the presence of a catalytic amount of a compound from the group consisting of a metal hydroxide from Group Ia and IIa of the Periodic Table and tertiary amines, quaternary ammonium salts, and quaternary ammonium hydroxides having at least one of the following characteristics:
        1. Water soluble,
        2. Liquefiable under conditions of the process,
        3. Gaseous under conditions of the process, whereby hydracrylamide is produced, dehydrating said hydracrylamide to produce acrylamide which is thereafter recovered.

5. The process of claim 4 where the metal hydroxide is an alkali metal hydroxide and is present in relation to the acrylonitrile to provide a molar ratio of from 0.005 to 0.1:1.

6. The process of claim 5 where the alkali metal hydroxide is sodium hydroxide and the molar ratio range is from 0.02 to 0.1:1.

7. The process of claim 4 where the ratio of water to acrylonitrile is at least 2:1.

8. A continuous process for producing acrylamide which comprises the steps of:
    I. Reacting from 1 to 50 moles of water with 1 mole of acrylonitrile under the following conditions:
        A. At a temperature between 230° to 450° F.,
        B. At a pressure between 50 psi to 800 psi,
        C. At a liquid hourly space velocity between 0.5 to 70,
        D. In the presence of an alkali metal hydroxide which is present in relation to the acrylonitrile to provide a molar ratio of from 0.005 to 0.5:1;
    whereby hydracrylic acid, hydracrylonitrile, and hydracrylamide are formed,
    II. Removing from the reaction hydracrylic acid, hydracrylonitrile and hydracrylamide;
    III. Returning to the reaction hydracrylonitrile;
    IV. Separating the hydracrylic acid from the hydracrylamide; and then,
    V. Dehydrating the hydracrylamide to produce acrylamide.

* * * * *